UNITED STATES PATENT OFFICE.

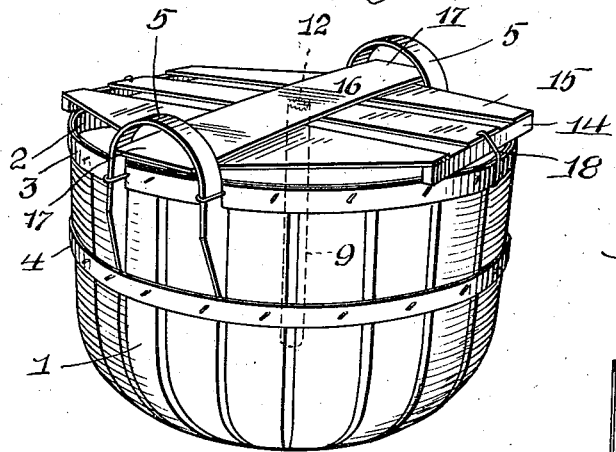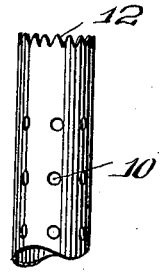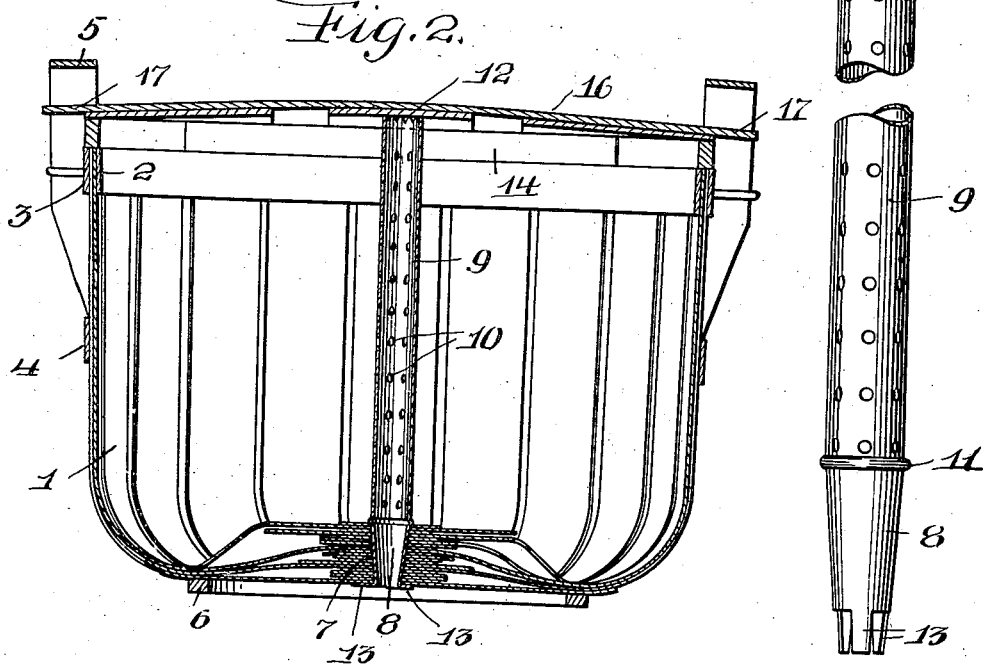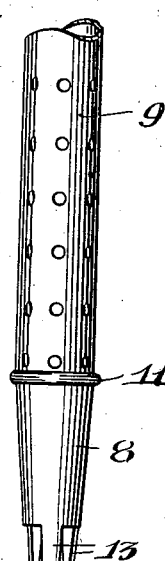

GEORGE J. FELLMAN AND RICHARD B. SHORE, OF PITTSBURGH, PENNSYLVANIA.

VENTILATOR FOR RECEPTACLES.

1,008,127.　　　　　Specification of Letters Patent.　　Patented Nov. 7, 1911.

Application filed February 9, 1911. Serial No. 607,504.

*To all whom it may concern:*

Be it known that we, GEORGE J. FELLMAN and RICHARD B. SHORE, citizens of the United States of America, residing at Pittsburgh, in the county of Allegheny and State of Pennsylvania, have invented certain new and useful Improvements in Ventilators for Receptacles, of which the following is a specification, reference being had therein to the accompanying drawing.

This invention relates to ventilators for baskets of various kinds, crates, boxes, and other receptacles particularly designed for storing and transporting fruits, vegetables and various kinds of perishable produce.

The primary object of our invention is the provision of novel means, in a manner as will be hereinafter set forth, for thoroughly ventilating the interior of a receptacle whereby the contents thereof will be prevented from becoming moldy, decomposed or disintegrated.

Another object of the invention is to furnish a receptacle with a ventilator that will serve functionally as a reinforcement for adding rigidity to the receptacle structure, thereby preventing collapse of the receptacle.

Our invention aims to reduce the expense of preparing produce for long distance transportation, to increase the longevity of produce receptacles, and to insure preservation of produce in storage and transportation. In this connection it is the present practice to store fruit baskets one upon the other in a car for transportation, the arrangement of the baskets necessitating the use of considerable lumber to maintain the baskets in this manner. In packing baskets in this manner the contents thereof are poorly ventilated and even with the best of packing the lids of baskets are liable to be crushed and rendered useless, besides injuring the basket and the contents adjacent to the lid.

Our invention further aims to brace the lid of a basket whereby it will withstand considerable pressure and the very means employed for bracing the lid is utilized as a ventilator for disseminating air throughout the basket.

With the above and other objects in view the invention resides in a novel construction to be hereinafter specifically described and then particularly claimed.

One embodiment of the invention is illustrated in the drawing, wherein:—

Figure 1 is a perspective view of basket in accordance with this invention. Fig. 2 is an enlarged vertical sectional view of the same. Fig. 3 is a side elevation of a portion of the ventilator.

In the drawing we have shown a basket having the side walls and bottom thereof formed by a plurality of staves 1 arranged one upon the other, radially disposed and bent to form a cylindrical structure. The upper ends of the staves are connected by an inner hoop 2 and an outer hoop 3. Another outer hoop 4 is secured to the staves intermediate the upper and lower edges of the basket, and suitably connected to oppositely disposed sides of said basket are inverted U shaped handles 5. The bottom of the basket has a ring 6 and centrally of the bottom the overlying staves 1 have a vertical tapering opening 7. In this opening is mounted the lower tapering end 8 of a ventilating tube 9. This tube is provided with a plurality of sets of radially disposed openings 10, the sets of said openings being arranged from the upper end of the ventilating tube to the tapering end thereof. The tube is provided with an annular bead 11 adapted to engage the uppermost stave and coöperate with the tapered end 8 in supporting tube 9 in a vertical position centrally of the basket. The upper edges of the tube 9 are scalloped to provide prongs 12 for a purpose that will presently appear and the lower tapered end thereof is provided with malleable lugs or prongs 13 adapted to be bent to engage the outer side of the lowermost stave and thereby lock the lower end of the tube in the bottom of the basket.

The lid employed for closing the basket comprises rails 14 connected by longitudinal slats 15 and these slats are connected by a transverse slat 16. The slat 16 is of a sufficient length to permit of the ends 17 thereof being sprung under the handles 5 and to further hold the lid upon the basket, hooks 18, carried by the hoop 3 have the upper ends thereof driven into one of the slats 15.

The foraminous ventilating tube has the upper scalloped end thereof protruding above the upper edges of the basket, whereby when the lid is sprung into position upon the basket the prongs 12 will engage in the underside of the lid. In this manner the upper end of the tube is centered and held while said tube serves functionally as a support for the central portion of the lid, thereby preventing accidental collapse of the lid when pressure is brought to bear upon the same by piling baskets one upon the other.

The foraminous ventilating tube can be made of sheet metal, pottery ware, wood, fiber or any other suitable material, and by making it of different lengths and shapes it can be utilized in connection with various kinds of receptacles. It is obvious that air can enter the bottom of the tube and be circulated centrally of the basket and that in some instances prongs 13 can be dispensed with.

What we claim is:—

1. The combination with a basket having the bottom thereof provided with a tapered opening, of a vertically-disposed foraminous tube having the lower end thereof seated in said tapering opening, bendable lugs carried by the lower end of the tube and adapted to engage the lower face of the bottom of the basket thereby anchoring the lower end of the tube, an annular bead carried by said tube and engaging the upper face of the bottom of the basket, and prongs provided at the upper end of said tube and adapted to engage in the lower face of the lide of the basket for anchoring the upper end of the tube.

2. The combination with a basket having a slatted body-portion and with the slats bent to provide the bottom of the basket, the ends of the slats overlapping, the said overlapping ends apertured to provide a vertically disposed tapering opening, of a foraminous tube having the lower end thereof extending in said opening, bendable lugs carried by the lower end of the tube and adapted to engage the lower face of the bottom of the basket for anchoring the lower end of said tube, an annular bead carried by said tube and engaging the upper face of the bottom of the basket, and in connection with said lugs clamping the overlapping ends of the slats together, and prongs provided at the upper end of the tube and engaging in the lower face of the lid of the basket for anchoring the upper end of the tube.

In testimony whereof we affix our signatures in the presence of two witnesses.

GEORGE J. FELLMAN.
RICHARD B. SHORE.

Witnesses:
 Max H. Srolovitz,
 Edwin P. Shore.